(12) United States Patent
Galiano (10) Patent No.: US 11,906,413 B2
(45) Date of Patent: Feb. 20, 2024

(54) APPARATUS AND METHOD TO DETERMINE ERYTHROCYTE SEDIMENTATION RATE AND OTHER CONNECTED PARAMETERS

(71) Applicant: ALIFAX S.R.L., Polverara (IT)

(72) Inventor: Paolo Galiano, Padua (IT)

(73) Assignee: ALIFAX S.R.L., Polverara (IT)

( * ) Notice: Subject to any disclaimer, the term of this patent is extended or adjusted under 35 U.S.C. 154(b) by 697 days.

(21) Appl. No.: 17/048,605

(22) PCT Filed: Apr. 17, 2019

(86) PCT No.: PCT/IT2019/050077
§ 371 (c)(1),
(2) Date: Oct. 18, 2020

(87) PCT Pub. No.: WO2019/202621
PCT Pub. Date: Oct. 24, 2019

(65) Prior Publication Data
US 2021/0116349 A1    Apr. 22, 2021

(30) Foreign Application Priority Data
Apr. 17, 2018 (IT) .................. 102018000004630

(51) Int. Cl.
| G01N 15/05 | (2006.01) |
| G01N 35/02 | (2006.01) |
| G01N 35/10 | (2006.01) |
| G01N 35/00 | (2006.01) |
| G01N 35/04 | (2006.01) |

(52) U.S. Cl.
CPC ........... *G01N 15/05* (2013.01); *G01N 35/025* (2013.01); *G01N 35/1079* (2013.01); *G01N 2035/00336* (2013.01); *G01N 2035/00524* (2013.01); *G01N 2035/0403* (2013.01); *G01N 2035/0444* (2013.01)

(58) Field of Classification Search
None
See application file for complete search history.

(56) References Cited

U.S. PATENT DOCUMENTS 4,436,827 A * 3/1984 Tamagawa ......... G01N 33/5304
                                                                     436/805
5,328,822 A * 7/1994 McKinney ............ G01N 15/05
                                                                     250/203.1
5,827,746 A † 10/1998 Duic
(Continued)

FOREIGN PATENT DOCUMENTS

| WO | WO-2007/006791 A1 | 1/2007 | |
| WO | WO-2007006791 A1 * | 1/2007 | ............. G01N 15/05 |
| WO | WO-2014/020392 A2 | 2/2014 | |

OTHER PUBLICATIONS

International Search Report and Written Opinion for PCT/IT2019/050077, dated Jul. 19, 2019.

*Primary Examiner* — Raul J Rios Russo
*Assistant Examiner* — Carl F. R. Tchatchouang
(74) *Attorney, Agent, or Firm* — MARSHALL, GERSTEIN & BORUN LLP (57) ABSTRACT

An apparatus and a corresponding method used, in the field of medical analysis, to determine erythrocyte sedimentation rate, as well as other connected parameters.

17 Claims, 4 Drawing Sheets

(56) References Cited

U.S. PATENT DOCUMENTS

| | | |
|---|---|---|
| 6,632,679 B1 † | 10/2003 | Breda |
| 8,647,886 B1 † | 2/2014 | Sacchetti |
| 2006/0288760 A1* | 12/2006 | Duic ................ G01N 15/05 73/61.69 |
| 2009/0120157 A1 | 5/2009 | Ciotti et al. |
| 2015/0300937 A1* | 10/2015 | Galiano ............. G01N 15/05 436/70 |

\* cited by examiner
† cited by third party

APPARATUS AND METHOD TO DETERMINE ERYTHROCYTE SEDIMENTATION RATE AND OTHER CONNECTED PARAMETERS

FIELD OF THE INVENTION

The present invention concerns an apparatus and the corresponding method used, in the field of medical analysis, to determine erythrocyte sedimentation rate (ESR), as well as other parameters related thereto.

BACKGROUND OF THE INVENTION

In the field of medical analysis, pathological states, defined as inflammatory, are ascertained by measuring the sedimentation rate of the corpuscular part of the blood, in particular of the erythrocytes, or red cells. In particular, the erythrocyte sedimentation rate represents a non-specific diagnosis test of the state of inflammation.

Different methods have been adopted to determine the ESR, which however have not proven to be completely satisfactory from the point of view of speed and practicality of detection.

In these methods, which use different measurement systems, the blood taken from the patients is introduced into tubular containers, or test tubes, and subsequently, after a possible centrifugation, the necessary measurements are performed on the blood samples.

Some known systems provide to detect, at predetermined time intervals, the position of the separation interface between the fluid plasmatic part of the blood, substantially clear, and the corpuscular part consisting of red and white blood cells and platelets, which is more turbid.

Other systems provide instead to detect the optical density or absorbance of the blood in correspondence with the separation interface.

The methods to determine the ESR proposed so far are generally characterized by an initial dead time which significantly influences the overall time of the analysis, which therefore cannot be performed in succession with other much faster analyses, such as for example blood count analysis.

Furthermore, known methods have to use disposable containers, which entails an increase in the cost both of their purchase and also of their disposal. Again, the amount of blood needed to perform the analysis is high and this leads to problems in particular cases, for example when the analysis has to be performed on children.

A method is also known which provides to take the blood to be analyzed from the container in which it is stored and insert the same blood in a measurement volume, of reduced thickness, which is used for various measurements performed on different samples. This method is based on detecting the optical density or absorbance of the blood in a fixed point of the measurement volume, which is rotated to accelerate the sedimentation of the blood.

The means used to detect the absorbance include electromagnetic radiation emission/detection devices associated with the measurement volume. The absorbance values detected are directly proportional to the number of blood cells present in the blood sample at the point of observation, this number varying over time due to the sedimentation of the blood cells themselves.

The study of the absorbance over time allows to trace the value of the ESR by eliminating the initial dead times, eliminating the need to use disposable containers for the analysis.

Furthermore, the required amount of blood to be analyzed is smaller, and therefore the analysis can also be performed without difficulty on pediatric patients.

Despite these merits, this method is characterized by some problems that limit its completely satisfactory use.

The size of the ESR measuring apparatus and the difficulties in managing multiple centrifugation means limit the possibility of coupling this system with an integrated instrument for counting blood cells. Furthermore, the size entails the need to perform the analysis in laboratory and the analysis procedure itself requires considerable volumes of blood.

Furthermore, after each measurement, the centrifugation means and the volume associated thereto must always be repositioned with respect to the emission/detector means, which creates problems and anomalies in the control of the blood flow.

In this apparatus, after the analysis, the blood sample is discharged and a new blood sample is introduced into the measurement volume.

To avoid washing the measurement volume after the discharge, the residues of the sample already analyzed are discharged by the new blood sample to be analyzed, the hydraulic path that the blood must complete to avoid pollution being rather long; this increases the volume of blood to be used.

A further limitation of this method is given by the fact that the acquisition of photometric data depends on the speed of rotation of the measurement volume and cannot therefore be considered a continuous phenomenon.

The state of the art proposes solutions to some of these problems, for example in U.S. Pat. No. 5,827,746, in EP 1.907.819, or in EP 2.880.418, all in the name of the Applicant. However, the need has been found to further perfect the apparatuses of the state of the art in terms of precision, efficiency and versatility, to provide methodological solutions that are even more adaptable to wide ranges of patients and in different operating conditions.

One purpose of the present invention is therefore to provide a method and the corresponding apparatus to determine the erythrocyte sedimentation rate, as well as other related parameters, which allow a fast, easy and reliable analysis, which can also be performed in combination with different types of hematologic analyses.

Another purpose of the present invention is to allow the integration of this apparatus into existing blood cell counting systems, thus exploiting the homogenization of the blood already performed by the same blood cell counter.

Another purpose of the invention is to provide an apparatus that is compact and easy to transport, practical to use in any condition and environment and which can also be used as a disposable ambulatory or hospital instrument, for example for so-called POCs (Points of Care), and which is particularly suitable for analysis on pediatric patients.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the apparatus to determine the ESR according to the present invention comprises, in its general structure, a capillary tube, transparent to radiations in a certain field of wavelengths, having at least a substantially rectilinear segment with extremely reduced sizes inside which the blood to be analyzed is introduced and made to pass.

By radiation, here and in the following description, we intend to refer to both electromagnetic waves, in particular those in the visible field, and also to different waves that follow the principles of undulatory mechanics, such as for example, but not limited to, sound waves, ultrasonic waves, or mechanical vibrations, as well as any other type of radiation that can be used in this context.

Therefore, although below, in particular in the detailed description of the drawings, reference will be made to light radiations and to optical-type emitters/detectors, it is understood that the invention is equally applicable to all types of radiations as indicated above.

The apparatus also comprises pump means able to send a blood sample inside the capillary, so that the blood sample can be passed through, in a measurement zone, by a radiation emitted by emitter devices and detected by mating detector devices disposed in correspondence with a point of the capillary tube, corresponding to the measurement zone, on the opposite side with respect to the emitter means.

The detector devices are connected to a control and processing unit able to transform the values detected in an expression of the sedimentation speed, or of other parameters connected thereto, into a measurement unit compatible with the units normally used.

According to possible embodiments, the pump means can be suitable to abruptly interrupt the flow of blood flowing through the capillary, so as to cause it to strongly decelerate (stopped-flow) and therefore an aggregation and sedimentation of the blood corpuscles thanks to its compaction.

The compaction causes a variation of the signal detected by the detector means with consequent acquisition of the information useful to determine the ESR.

At the end of the detection, the blood sample analyzed is discharged from the circuit and the capillary tube is ready to receive a new blood sample to be analyzed.

According to a variant, the capillary tube comprises a reading chamber in correspondence with which the measurement is performed.

In particular, one formulation of the present invention provides that the reading chamber consists of a small (capillary) measuring tube, for example with a cylindrical section, although this shape is not in itself limiting, and made of plastic material, for example, but not only, acrylic material, or of glass. The use of these materials allows the capillary tube to be modeled also, and in particular, in the entry and exit surfaces of the radiation detected by the reception means.

The small capillary tube defines a transit channel that is coupled in fluidic continuity with the supply pipe, normally made of Teflon, of the samples to be analyzed.

The particular shape of the measuring tube of acrylic material or glass is made so that the entry zone of the light, of the sound waves, or of other suitable radiation, has a substantially flat or suitably shaped surface, instead of a curvilinear cylindrical surface as in the case of a conventional tube.

According to a further evolutionary characteristic, the measuring tube also has a flat surface at its opposite end, that is, the exit end, so that the path of the optical, sound or other type of radiation is not deflected/refracted by curvatures which alter its information content.

Thanks to these substantially flat surfaces facing the emitter/detector devices, the radiation emitted is less subject to perturbative factors that can invalidate the correctness and accuracy of the measurement.

In particular, these reading windows with a flat surface interact with the radiation incident on it independently of their positioning inside the standard positioning tolerances for mechanical workings.

According to a further variant of the invention, these flat windows constitute transparent, non-diffusive surfaces such as those of a conventional tube, generally made of Teflon, and allow to obtain much higher optical or sound detection sensitivity.

According to a variant of the invention, the reading chamber with measuring tube made of acrylic material, or glass, is connected to a conventional type of pipe, for example made of Teflon, upstream and downstream, in which the movement of the blood sample occurs.

In a further characteristic, the glass or acrylic reading chamber is housed inside a rigid container, which defines the housing seatings for the upstream and downstream pipes that define the path of the blood sample to be analyzed.

In a further embodiment, the rigid container also has collimation means which define the path of the optical, sound or other type of beam which passes through the reading chamber.

Thanks to this configuration of the measuring chamber, it is possible to measure the flow velocity, in the stopped-flow, or stop and flow, step which facilitates the measurement of the viscosity of the blood sample and makes it more precise.

According to a further characteristic of the present invention, the measuring method, thanks to the characteristics of the apparatus, and in particular of the measurement cell, described above, allows to avoid contamination between sample and sample, that is, avoiding the so-called "carry-over" phenomenon, which leads to contamination between successive samples and therefore to obtaining distorted measurements or the need for washing between samples.

The method according to the present invention provides to collect a sample of blood in extremely small quantities, able to facilitate pediatric or capillary sampling, for example in a range from 30 microliters to 180 microliters.

According to possible embodiments, the method can provide to use latexes to improve the calibration and adjustment of the measuring instrument. For example, the use of three-level turbidity latexes can be provided to calibrate the accuracy of the measurement.

In particular, the use of the latexes allows to detect the functionality of the internal sensors of the equipment to guarantee measurement and calibration performances that certify the correct functioning of the instrumentation. This aspect is even more important as the measurement of the ESR is not an exam that has external controls, as for example blood glucose analysis.

According to the invention, the measuring instrument comprising emitter and detector devices is located at a specific point in the blood flow which corresponds to the end of travel of each sample read.

Through the use of the reading chamber made of acrylic or vitreous material, located inside the rigid support, and also thanks to the collimation of the radiation emitted, it is possible, according to the invention, to always measure the terminal part of the sample, the so-called tail of the sample, which is free from contamination of the previous sample.

Furthermore, in this way all the blood samples that follow are not, at the measuring point, contaminated by the previous one.

In one embodiment of the invention, the volume of blood in the reading chamber is approximately equal to 1 microliter, while the amount of blood of each pediatric sample per individual patient can be in a range from 30 microliters to 180 microliters.

In particular, the present invention allows the sample to be read in a volume of 1 microliter of whole blood, whether the blood sample is analyzed at one point of the pipe, or whether it is analyzed in the reading chamber.

According to one characteristic of the invention, the reading and measuring point is located in such a position, with respect to the measuring chamber, and in particular to the glass or acrylic tube, that the microliters of blood pass and are made to flow through the reading chamber as an inert passage, without any measuring of said part.

The reading of the sample is started for a portion of 1 microliter in volume on the last 5 microliters of the initial volume.

The passage of the microliters of inert blood through the reading chamber of 1 microliter has the function of mechanical thrust or washing.

The thrust volume on which no measurement is made allows to offer the non-contamination between sample and sample in the last 5 microliters. Therefore, the passage of the sample to be analyzed has a self-washing effect with respect to the previous sample.

Thanks to this, the invention allows to perform measurements on drops from capillary sampling (for example 25 microliters) and at the same time does not require washing between samples, making it particularly suitable for use in so-called Points of Care (POCs) and for pediatric use.

In other words, the sequential self-washing of the sample allows to avoid the carryover phenomenon.

To summarize, the advantages offered by the present invention, and in particular the conformation and structure of the reading chamber, are the following:
- it is possible to perform ESR measurements with reduced sampling volumes that are very suitable for pediatric patients and capillary samples;
- there are no reductions in the precision of the measurement due to deviation of the radiations caused by problems connected to the manufacture of conventional tubes;
- both pediatric samples and also adult patient samples benefit from the self-washing system of the sample itself, avoiding carryover between sample and sample;
- experimental ESR measurement tests of very high and very low alternate samples confirm the same results even reversing the same samples.

In the apparatus according to the invention, the capillary tube, the blood sampling means and the measuring instrument can constitute a transportable structure which is distinct and separate from the control and processing unit, and from a possible system to display the results, and be connected to them by means of transmission cables or also via radio.

In this way, extreme flexibility and versatility of use is obtained, since the sampling and analysis instrument can have reduced sizes that allow its use, for example, also directly from the bed of a patient, or in any case in challenging conditions.

It is also possible both to use a plurality of these apparatuses in parallel, to simultaneously perform the same analysis on different blood samples, and also to use the same apparatus in series with other devices, able to perform different types of hematological analyses on the same sample.

Furthermore, this apparatus, also as a result of the very short time required for the analysis, can also be used in local clinics, in hospital rooms, in mobile hematological units or, as we said, integrated with equipment intended for other types of hematological analyses.

This apparatus, allowing a continuous analysis directly after the withdrawal of native blood from the patient, does not require the use of anticoagulant substances, as the blood can be analyzed before the clot has time to form.

In particular, the continuity of data acquisition by the detector means allows a better evaluation of the optical density of the blood sample, and therefore an extremely precise measurement of the ESR, and allows to detect possible abnormal states of the blood flow, for example due to air bubbles or clots.

The continuous study of the flow can also be used to determine other parameters of blood rheology, such as density or viscosity.

According to possible embodiments, the control and processing unit can be configured to compare the viscosity of the sample with the ESR value obtained.

In a preferred solution of the invention, the pump means are reversible and allow to invert the flow inside the circuit; this allows the re-homogenization of the blood sample and the rapid repetition of the measurements thereon.

The capillary is able to be thermostated to allow analysis at a constant temperature which can be preset as desired.

It is therefore possible to make the same sample of blood pass through capillary tubes thermostated at different temperatures and disposed in series, evaluating the ESR values according to the variation in the analysis temperature.

In this case, it is preferable that at least one of the capillaries is kept at a temperature around 37° C., in order to prevent the precipitation of some blood components and to guarantee a reliable comparison model.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
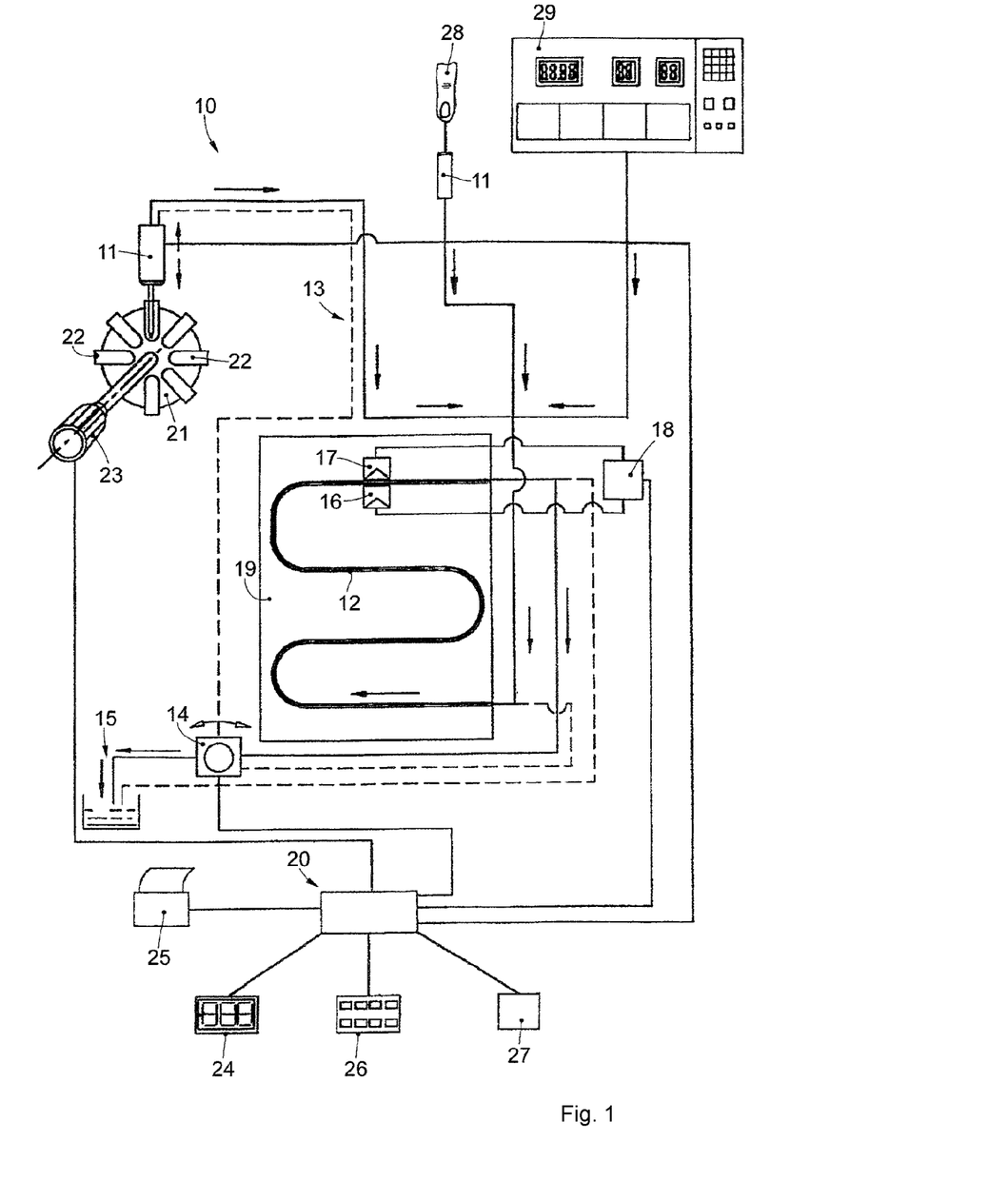
FIG. 1 schematically shows a first embodiment of an apparatus to determine the erythrocyte sedimentation rate and other parameters according to the invention.

FIG. 1 schematically, and non-restrictively, shows, as a whole, an apparatus 10 to determine the erythrocyte sedimentation rate and other parameters connected thereto, which mainly comprises the following components:
- a sampling member 11 to take the blood sample to be analyzed;
- a pipe 12, for example made of Teflon, inside which the blood sample is able to be introduced, transparent to electromagnetic radiations in a field comprised between 100 and 2000 nm, preferably between 200 and 1000 nm;
- a circuit 13 that connects the sampling member 11 to the pipe 12 and inside which the blood sample circulates;
- a pump 14 associated with the circuit 13;
- a discharge pipe 15 to discharge the blood sample after the analysis;
- a measuring instrument comprising a radiation emitter device 16 associated with a mating detector device 17, in this specific case disposed on opposite sides with respect to a specific point of the pipe 12;
- a control and processing unit 20 able to manage the functioning of the apparatus 10, and—an interface unit 18 by means of which the devices 16 and 17 are connected to the control and processing unit 20.

The sampling member 11, in this specific case of the syringe type, is able to selectively take the blood sample to be analyzed from the containers, or test tubes 22 of a storage drum 21, which can be rotated by a motor 23, for example to perform programmed mixing cycles of the blood contained in the test tubes 22. In a possible solution, the motor 23 can perform the mixing by means of tilting cycles of the storage drum 21.

An accurate mixing is essential to correctly perform an examination on red cells that have not already aggregated during the time between the sampling in the blood collection tube and the execution of the test. The mixing is therefore used to disaggregate the red cells and then perform the ESR measurement correctly.

According to possible embodiments, the test tubes 22 can be test tubes of the standard type, used for example for hematology measurements.

Figure 2:
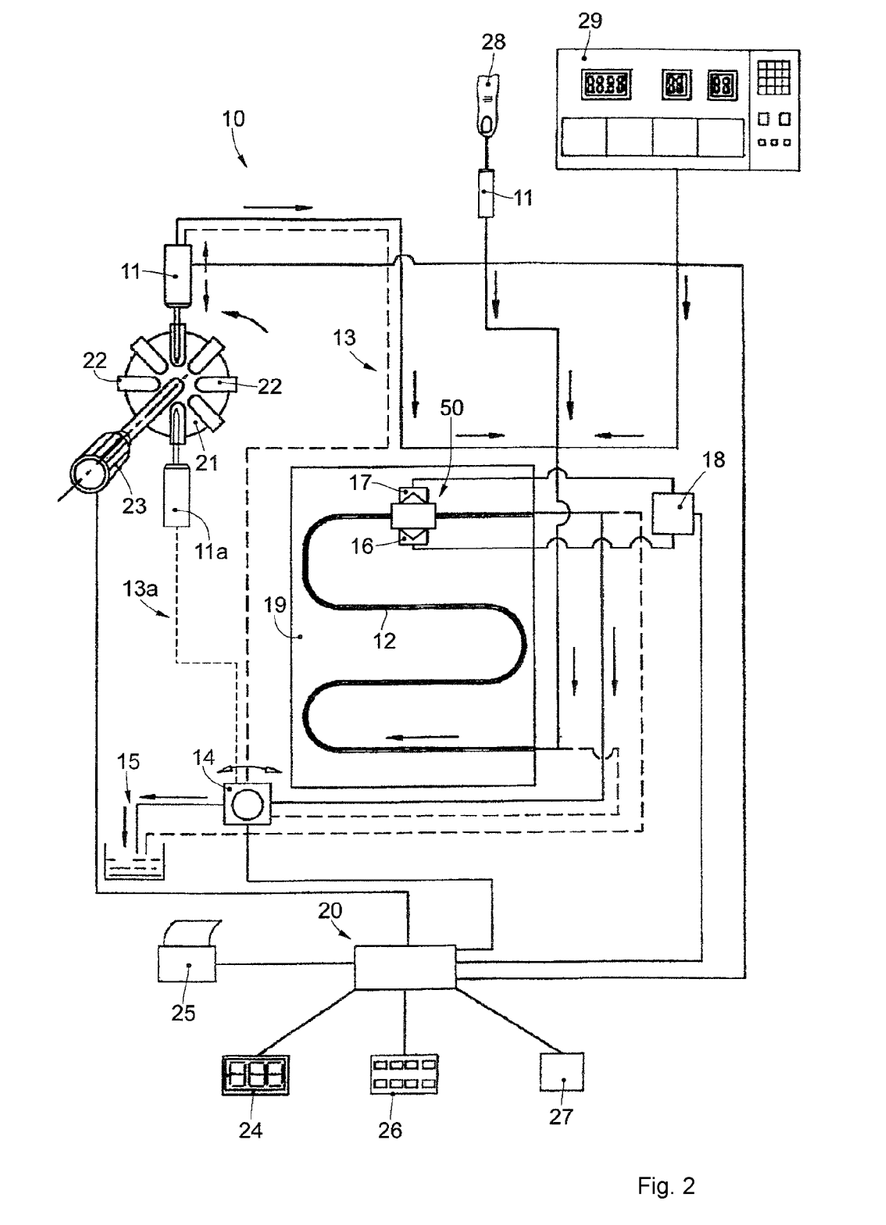
FIG. 2 schematically shows a variant of the apparatus in FIG. 1.

According to the embodiments shown in FIGS. 1 and 2, the sampling member 11 can also be used to directly take native blood from the finger 28 of a patient, for example performed with a lancing device of the finger pricking type, containing inside it the devices 16, 17 and the point of the pipe 12 in which the measurement is performed.

Furthermore, the blood to the pipe 12 can also come from an apparatus 29 suitable to perform other analyses, inside which the entire apparatus 10 can be integrated; in this way, already homogenized blood, which does not require other additional treatments, reaches the pipe 12.

In a variant, the sampling member 11 is provided integrally with shaking means to homogenize the blood sample taken.

The pipe 12 is associated with a metal support 19 provided with thermostat means which allow it to be kept at a constant temperature which can be preset as desired, conditioning the temperature at which the analysis is performed.

The pump 14, which can be disposed both upstream and downstream of the pipe 12, is able to drive the sampling member 11 to circulate the blood sample inside the circuit 13 and the pipe 12.

According to possible embodiments, the pump 14 can be a peristaltic pump, configured to move the blood sample up to the established reading point.

The reading point is determined precisely in order to prevent the carryover phenomenon.

In the event that the response of the examination indicates the absence of flow, due for example to any obstruction of the capillary tube, the peristaltic pump can switch the flow with a return movement of the sample taken, and repeat the examination; or, if the response of absence of flow persists, a new cycle of taking a sample from a primary test tube can be activated.

According to possible embodiments, the blood sample can be read by the measuring instrument passing through the reading point in a continuous flow, that is, without interruption of the flow.

Alternatively, the pump 14 can be configured to interrupt the flow of the blood sample instantaneously, so as to cause a strong deceleration (stopped-flow) and therefore an aggregation of the erythrocytes.

According to possible embodiments shown in FIGS. 1 and 2, the pump 14 is reversible and is able to allow blood circulation inside the circuit 13 in the two directions indicated respectively with a continuous line (suction) and with a dotted line (thrust).

The interface unit 18 is able to activate/deactivate the emitter device 16 and to translate the signals received by the detector device 17 into signals that can be read by the control and processing unit 20.

According to possible embodiments, the measuring instrument can comprise a plurality of detector devices 17. In this way, the measuring method can detect radiations from a plurality of detector devices 17 in a single reading of the sample, so as to improve possible compensations.

For example, the detector devices 17 can be three detector devices 17 positioned equidistant from one another.

According to possible embodiments, the detector device 17 can be configured to detect electromagnetic waves with a wavelength comprised between 700 nm and 1 mm, that is, they can be infrared waves.

According to these embodiments, the measuring instrument can be configured to measure the temperature of the blood sample.

Furthermore, by means of the infrared wave detector device 17, it is possible to obtain an effective mixing of the sample.

Furthermore, the aggregation of the red cells thus obtained is not affected by low temperatures.

Embodiments of the present invention provide that the control and processing unit 20 can be configured to compare the temperature values detected by the detector device 17 with predetermined values, so as to possibly discard blood samples having a temperature lower than a predetermined threshold value, for example 18° C.

According to the present invention, the control and processing unit 20, consisting of a microprocessor electronic processor, is programmable to manage different functioning modes of the apparatus 10.

According to possible embodiments, the control and processing unit 20 can be configured to compare the values detected by the detector device 17 with preset values, and to signal to the user the possible non-suitability of the blood sample. For example, if the hematocrit values are below 25%, the control and processing group 20 can signal to the user its non-suitability.

The control and processing unit 20 comprises a database or internal memory 27 which contains a series of parameters, in the form of numerical data, tables or graphs.

In particular, the database 27 can be provided with a statistical memory comprising values of multiple of samples, for example 5,000 different samples, so as to determine a mean of the tested population.

According to possible embodiments, the method according to the present invention can provide a statistical control of the population based on the values comprised in the database 27. The database 27 can be continuously updated, and therefore the values relating to the mean of the population tested are always updated by the results of the tests performed.

According to possible embodiments, the control and processing unit 20 can be configured to cooperate with a population management software, so as to provide a measurement graph to detect possible measurement errors, or drifts.

In particular, the control and processing unit 20 can be configured to detect a possible drift of the measurements of the blood samples taken from the apparatus 10 with respect to the mean of the tested population.

Furthermore, according to possible embodiments, the measuring instrument can be configured to perform at least one test attempt even if the control and processing group 20 detects that the sample is not suitable.

According to this embodiment, the measuring instrument can therefore be configured to stop after performing a desired number of attempts, for example three attempts.

According to possible embodiments, the control and processing unit 20 can be configured to cooperate with a management software.

The management software, among its many functions, can also store the expiry date of the latexes used in order to calibrate the accuracy of the measurement, so as to avoid the use of latexes beyond their expiry date.

The management software can also be configured to verify that the measuring method meets the health regulations in force in different countries. For example, the management software can verify that the measuring method complies with the standards established by the Food and Drug Administration (FDA) of the United States of America.

The control and processing unit 20 also comprises means to interface with the user, in this specific case consisting of a keyboard 26 for data input, a monitor or display 24 and a printer 25 to display the results of the analysis and to process them for statistical purposes.

According to possible embodiments, the measuring instrument can be configured to detect the aggregation of the red cells and to correlate this value with the ESR values determined.

In particular, this correlation can also be performed for blood samples affected by red blood cell pathologies, such as anemia (for example sickle cell anemia), microcythemic samples, or suchlike.

According to possible embodiments, shown by way of example only in FIG. 2, the pipe 12 can transport the sample toward a reading chamber 50, which comprises a capillary measuring tube 51 (FIGS. 3 and 4), consisting of a small cylinder made of plastic material, for example acrylic, or glass.

The reading chamber 50 is made in a rigid container 52 (FIG. 3) which has, in this specific case, a central through hole 54 where the capillary 51 is housed. According to a variant, the capillary 51 is housed in a closed volume defined by transparent lenses (not visible in the drawing) disposed to close the through hole 54.

Figure 3:
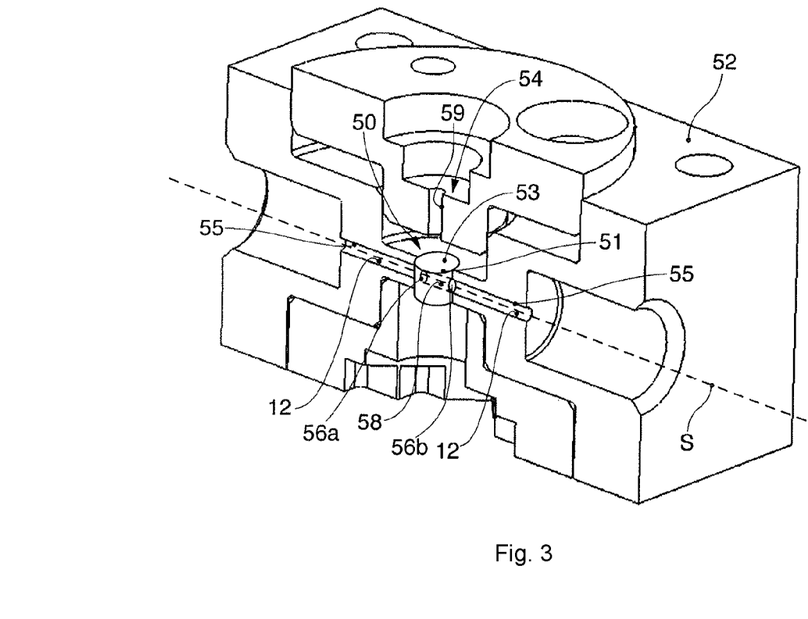
FIG. 3 shows a detail of the apparatus in FIG. 2.
Figure 4:
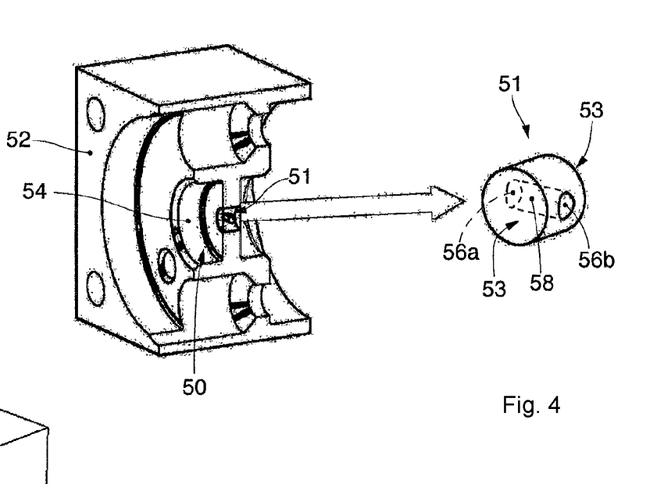
FIG. 4 shows an exploded view of the detail in FIG. 3.

The capillary 51, by means of a pair of holes respectively front and rear 56a and 56b, connects upstream and downstream to the pipe 12 so that the blood sample being examined can flow forcedly through it to be passed through by the beam of waves emitted by the emitter device 16.

According to possible embodiments, the reading chamber 50 can be configured to allow to read the blood sample also in conditions of absence of gravity.

In particular, in conditions of absence of gravity, the flow of the peristaltic pump, that is, its thrust force, is slowed down in order to adapt to the lower resistance to which it is subjected.

According to possible embodiments, the reading chamber 50 can be associated with the thermostat means as an alternative or in addition to the thermostat means possibly provided on the metal support 19.

The controlled thermostat allows to reduce the variables in performing the ESR measurement determined by variations in the external temperature, even in the context of variations of $2/3°$ C. of external temperature.

The rigid container 52 has housing seatings 55 for the corresponding segments of the pipe 12, so as to ensure an optimal and stable fluidic connection between pipe 12 and capillary tube 51.

According to an advantageous embodiment, the emitter device 16 and the mating detector device 17 are facing and opposite the capillary 51 and are respectively able to emit and detect electromagnetic radiations with a wavelength advantageously comprised between 200 and 1000 nm.

The capillary 51 has opposite flat surfaces 53 facing toward the emitter device 16 so that the path of the electromagnetic wave is not deflected/refracted by curvatures which alter its information content.

The rigid container 52 has channels 59 which allow the beam of electromagnetic waves to concentrate only in correspondence with the capillary 51, so that it is only a portion of the blood sample that is affected by the measurement. In particular, as will be seen more clearly below, the reduced portion of the sample subjected to analysis allows to obtain the important self-washing effect between one sample and the following one.

According to possible embodiments, the pipe 12 and/or the reading chamber 50 can be associated with a self-washing device, so that when a substantial portion of the subsequent blood sample is made to pass, for example 20 ml of a total of 25 ml, it is made to pass through the pipe 12 and/or the reading chamber 50 as an inert passage, without performing any measurement, so as to perform a mechanical thrust or washing function on the sample present in the pipe 12 and/or in the reading chamber 50.

The thrust volume of 20 microliters on which no measurement is performed allows to offer the non-contamination between sample and sample in the last 5 microliters, avoiding the so-called "carryover" phenomenon, which leads to obtaining distorted measurements.

Thanks to the use of the capillary 51, the incidence of geometric and manufacturing tolerances on the precision of the measurement is reduced, if not eliminated, as the optical signal is perfectly collimated and is not deviated or altered by disturbing thicknesses or elements. It should also be considered that the glass or acrylic material, intrinsically, do not suffer from the problems connected with the use of traditional Teflon tubes.

Furthermore, the use of the capillary 51 as described above allows to suitably design the entrance surface of the radiation emitted by the emitter device 16.

For example, in relation to the emission characteristics (type of wave, wavelength, distance, etc.) it is possible to size the radiation entrance surface to obtain a plane wave of constant intensity inside the device around the passage channel of the sample. In this way it is possible to obtain a high insensitivity to the positioning errors of the channel itself, so that the measurement will guarantee a high repeatability regardless of possible assembly inaccuracies, as well as guaranteeing an increase in sensitivity so that the measurement can also be performed with quantities of sample to be analyzed in the order of the microliter.

According to possible embodiments, the reading chamber 50 and/or the capillary 51 can have a section of 0.8 μm2. This section advantageously allows to simulate the blood flow of a human vein.

Thanks to the present invention it is therefore possible to perform other types of measurements, for example the measurement of the refractive index of plasma which provides indications on the protein content in the blood. This allows the apparatus 10 according to the present invention to be able to perform the following functions:
- measure absorption making the measurement of optical density (imaginary part of the refractive index) independent of the protein content (real part of the refractive index);
- measure the refractive index of plasma from whole blood and from plasma;
- measure a synergy of the two quantities (measure both the real and also the imaginary part of the refractive index) to obtain the measurement of the ZSR (Zeta Sedimentation Rate) which represents an alternative test to the measurement of the ESR in which the test tube containing the sample is overturned before being subjected to measurement;
- measure the refractive index in real and imaginary part of the blood by comparing its values during the blood flow in the polarizations of the electric field parallel and perpendicular to the flow.

In particular, the present invention allows to measure the ESR also from blood samples with low hematocrit.

According to possible embodiments, the ESR measurement can be performed with a volume of whole blood taken from a test tube of the EDTA/Citrate type and/or with a volume of native blood just taken from a patient.

In particular, the EDTA/Citrate type test tube has a minimum volume comprised between 8 ml and 30 ml of whole blood.

According to possible embodiments, the method to determine the erythrocyte sedimentation rate provides the analysis of a blood sample from a test tube and the perforation of the stopper of the test tube before the analysis.

In this way, the sample is aired before performing the measurement (preventive venting), improving the stop and flow reading dynamics in the hematic flow.

In particular, venting allows to standardize the pressure inside a tube that has a vacuum inside it, so that the peristaltic pump, optimized according to a fixed number of motor steps, can present an identical position for all blood samples taken and aspirated to the reading sensors.

Furthermore, it allows to create identical air bubble lengths for all blood samples, to not obtain an oblong air bubble due to the different internal pressure of the sampling tube located in the mixing rotor, and to obtain identical positions for all samples taken in loading sequence—see reading point or head-to-tail blood sample, as well as to guarantee an efficient head-to-tail self-washing of the blood samples.

According to these possible embodiments, the detector devices 17 can be configured to compensate for the different internal pressures of the test tubes 22.

In some cases, the blood sample cannot be exposed to contact with air, so the test tube is pierced without airing the sample. Therefore, in the sampling test tubes there is no rebalancing of the internal pressure, and the needle is subject to a variation in pressure.

The negative pressure inside the vacuum test tube is not constant, which does not allow to start the movement of the sample to be analyzed in the pipe 12 in a precise and cadenced manner.

According to possible embodiments, the method provides to rotate the test tube, before taking the blood sample, at a programmable mixing speed, for example 24, 32 or 60 rpm.

According to possible embodiments, the number of rotations can be comprised between 1 and 1000.

According to possible embodiments, the method provides to detect the aggregation of red cells, and hence the measurement of the ESR, by actuating variable mixes of the sample in relation to the quantity of blood contained in the test tubes. Therefore, it is possible to perform the erythrocyte sedimentation rate (ESR) test with a well-mixed blood sample, that is, with well disaggregated and dispersed red cells, in order not to obtain incorrect samples which have high ESR determined by the formation of stacks of pre-existing rouleaux and therefore detectable by the detector devices 17.

According to a first example, a blood sample test tube, containing between 3 ml and 7 ml of blood, can be mixed at a speed of 32 rpm for 140 rotations.

According to a further example, a blood sample test tube containing 5 mL of blood can be mixed at a speed of 24 rpm for 140 rotations. Consequently, the time to perform mixing in the second example is greater than the time required in the first example.

The blood normally tends to adhere to the bottom of the test tubes due to the surface tension. To allow analysis of the blood adhering to the bottom of the test tubes, one formulation of the method according to the present invention can comprise a first step in which the test tube is first mixed at high speed, so as to free the blood attached to the bottom of the test tubes, and a second step of mixing at a conventional speed, for example 32 rpm for 140 rotations. This advantageously allows to also carry out checks from test tubes containing a reduced quantity of blood. In particular, the present invention can be used to detect the ESR from a pediatric sample. For example, the blood sample can be taken from pediatric microcuvettes whose content varies from 50 μl to 100 μl.

According to possible embodiments, the sample can also continue to be mixed during the analysis.

According to possible embodiments, shown by way of example in FIG. 2, the apparatus 10 according to the present invention can comprise a second external sampling member 11a provided with another circuit 13a, independent of the first circuit 13, in which the second sampling member 11a is able to take the blood sample from a test tube from the top downward. This method is particularly suited to pediatric samples and/or samples with urgent request.

The second sampling member allows to perform an examination of the sample in urgent conditions without interacting with the flow of samples already inserted in the mixer module; in particular, it allows to perform said examination, for example, in cups for pediatric use which are not in the external configuration, therefore have different sizes to sampling test tubes for adults that can be inserted into the mixer. These pediatric sampling cups have a small amount of blood available and the volume of blood that can be taken on which to perform the test is different from the amount of blood supplied by test tubes for adults.

According to these embodiments, following the mixing, the method provides to overturn the test tube, that is, to rotate it by 180°, so as to dispose the part provided with the stopper facing downward. In this way, the second sampling member 11a is inserted into the test tube from the bottom upward.

This allows, advantageously, to insert the second sampling member 11a by a limited length inside the test tube, for example about 2-3 mm inside the test tube, allowing to also collect a sample of a quantity of blood in test tubes with critical volume, as the needle that pierces the stopper of the test tube 22 enters it by a fixed amount and allows to be certain of collecting the blood sample correctly.

In this configuration, furthermore, it is possible to collect the blood efficiently and quickly even from a test tube containing reduced amounts of blood, such as a pediatric microcuvette, even if it has been used for other analyses, such as blood cell count.

According to the present invention, once the sampling member 11, 11a is inserted inside the test tube, the collection of blood is performed by aspiration of a determined theoretical quantity of blood, for example 175 μl.

According to a further formulation of the present invention, an air bubble can be formed in the pipe 12, between the sampling member 11, 11a and the pump 14, which, for example, can separate two successive blood samples.

According to possible embodiments, the control and processing unit 20 can detect the position of the air bubble by means of the detector devices 17, so as to establish the point 0 where movement starts. In this way, the control and processing unit 20 can regulate the drive of the pump 14 to determine a sequential movement, that is, step by step, starting from a certain point, thus avoiding measurement errors due to uncertain distances between two successive samples. The step-by-step movement then allows to read the blood sample at the predetermined reading and measuring point in the final part of the sample, that is, the tail part, therefore on a certain and predetermined amount of blood, ensuring the reading of the sample part not contaminated by the previous sample, that is, eliminating the carryover effect between samples collected in load sequence.

The air bubble allows to separate the sample/sample blood flow and the amount of blood inside the measuring tube, which allows to eliminate the sample/sample carryover.

The movement of the blood thanks to the zero point determined by the air bubble allows to identify with extreme precision the reading point detected by the fluorimetric sensors to allow the sample/sample self-washing.

The zero point of photometric reading determined by the air bubble, which indicates the air-blood divide, allows to re-read a blood sample if the photometric reading (NF) indicates the absence of flow for any reason, for example due to the presence of a residue of rubber or a volume of blood sampled that is not sufficient for the measurement, for example less than 30 microliters of blood sampled. The air bubble determined by the peristaltic pump therefore allows to calibrate the assembly procedures in order to verify the correct movement of the blood flow. Therefore, the air bubble has an active function and does not simply separate blood from bubble.

As an effect of the depression of the pump 14 which is downstream of the measuring instrument, and the atmospheric pressure, the blood is fed toward the measuring instrument.

According to possible embodiments, the control and processing unit 20 is configured to activate the pump 14 and feed the blood toward the detector devices 17, keeping the level of the signal to detect the end of the air bubble and the beginning of the blood sample monitored.

In this way, the reading is performed in the tail portion of the sample to compensate for the possible positioning error caused by the depression inside the test tubes.

According to possible embodiments, wherein the pump 14 is a peristaltic pump, the control and processing unit 20 can be configured to position the blood sample below the first roll of the pump 14. In this way, advantageously, the first roll of the pump 14 acts as a closed valve and prevents the blood from moving in the circuit 13, 13a during the readings.

Otherwise, the blood would continue to move toward the pump 14, compromising the execution of a correct stopped-flow procedure, as well as the accuracy and repeatability of the measurements.

According to possible embodiments of the present invention, the detector devices 17 can be configured to detect the air bubble which separates the sample under examination from the following sample.

In this way, the control and processing unit 20 can associate the detection of the air bubble with a beginning of travel zero point, so as to time the movement of the sample in the pipe 12.

The method according to the present invention, therefore, provides to detect, by means of the detector devices 17, the air bubble which separates a sample under examination from the following sample so as to activate the movement of the sample in the circuit 13, 13a in a desired zero point.

By means of the present invention, therefore, it is possible to obtain a precise and repeatable measurement of the tail portion of the sample, so as to avoid the carryover phenomenon even in the absence of venting of the sample.

Figure 5:
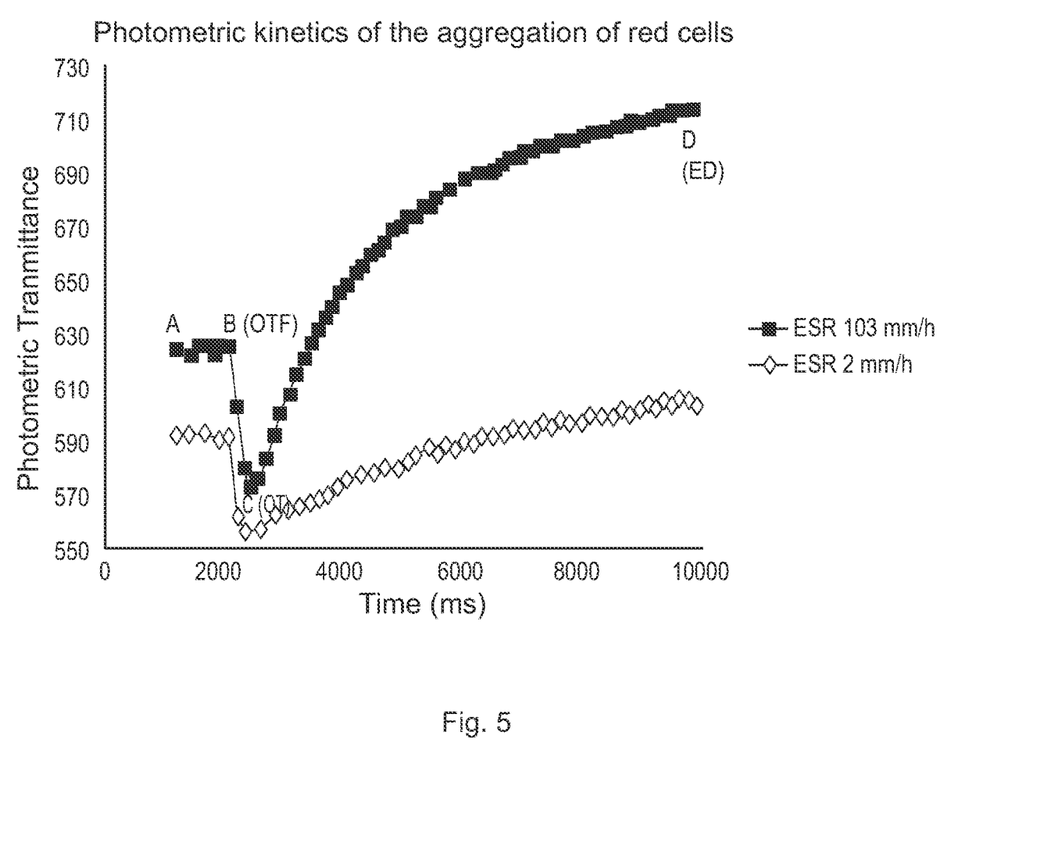
FIG. 5 schematically shows a measurement diagram obtained with the apparatus according to the present invention.

With reference to FIG. 5, a syllectogram is shown in which ESR values are indicated at different speeds.

A first curve will now be described, that is, the top curve shown in FIG. 5 and corresponding to kinetics of aggregation of a sample with an ongoing inflammatory pathology or process, having an ESR of 103 mm/h, obtained with a method according to the present invention.

The segment from point A to point B—also known as OTF (Optical Transmittance during Flux) point—represents the blood still moving in front of the sensor before the pump 14 stops.

The segment from point B to point C—also known as OT (Optical Transmittance)—represents the clouding of the blood caused by the random redistribution of red cells after the pump 14 has stopped.

In the segment from point A to point B, the red cells are aligned substantially horizontally following the flow of blood during the suction of the pump 14, and when the pump 14 stops in point B they begin to dispose themselves randomly by rotating on themselves and clouding the suspension (segment from point B to point C).

The red cells then begin to aggregate forming stacks of rouleaux, and the suspension becomes clearer, expressing kinetics of aggregation from point C to point D, also called ED (End of Detection).

The second curve, indicated at the bottom of FIG. 5, corresponds to a kinetics of aggregation of a non-pathological sample, and has an erythrocyte sedimentation rate (ESR) of 2 mm/h, performed with a traditional Westergren method on a glass rod with an internal diameter of 2.55 mm, and 200 mm high.

As seen from the syllectogram shown in FIG. 5, the present invention allows to correlate the ESR values obtained in short times with the ESR values obtainable with conventional methods. The present invention, therefore, allows to correlate the kinetics of the aggregation of red cells with the final result of the Westergren gravitational sedimentation.

According to possible embodiments, the present invention provides to detect the aggregation of red cells, and hence the measurement of the ESR, by using electromagnetic radiation at 1000 pulses per second, by means of the emitter devices 16 and the detector devices 17. This pulse measurement allows, advantageously, to detect the aggregation process of the sample also in the form of a graph of the sedimentation, as shown in FIG. 5.

According to possible embodiments, the test tube can be provided with an identification code, for example a bar code, so as to interface the values measured by the sample contained in the test tube with the preset values in the Laboratory Information System (LIS) and/or in the database 27.

It is clear that modifications and/or additions of parts may be made to the apparatus and to the method as described heretofore, without departing from the field and scope of the present invention.

For example, the emitter 16 and detector 17 devices can be positioned on the same side of the pipe 12 or of the capillary 51 and detect the reflection of the emitted radiation.

Furthermore, the emitter device 16 can be suitable to emit polarized light, in order to obtain characteristic analysis results according to the polarization.

Or, the instantaneous blocking of the flow of the blood sample can be performed by valve means associated with the circuit 13 and/or the pipe 12.

It is also clear that, although the present invention has been described with reference to some specific examples, a person of skill in the art shall certainly be able to achieve many other equivalent forms of apparatus and method, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An apparatus to determine erythrocyte sedimentation rate and other connected parameters, comprising:
    a sampling member to take the blood sample to be analyzed disposed in test tubes;
    a pipe inside which the blood sample is able to be introduced, transparent to electromagnetic radiations in a field comprised between 100 and 2000 nm;
    a circuit that connects said sampling member to said pipe and inside which the blood sample circulates;
    a pump associated with said circuit and cooperating with means to create an air bubble between two successive blood samples;
    a discharge pipe to discharge the blood sample after the analysis;
    a measuring instrument comprising a radiation emitter device associated with a mating detector device, together defining a measuring zone;
    a control and processing unit able to manage the functioning of said apparatus;
    an interface unit that connects said radiation emitter and mating detector devices to said control and processing unit, wherein said pump, with each measuring cycle, is configured to take a quantity of blood in a range from 30 microliters to 180 microliters, and wherein said measuring instrument is configured to perform the measurement on a quantity equal to about 1 final microliter of said initial sample quantity;
    a motor to make the test tubes rotate or tilt before the sampling in order to perform programmed mixing cycles of the blood contained in the test tubes, wherein said sampling member is configured to take the blood sample from the test tubes both oriented with a stopper of the test tubes facing upward and also oriented with the stopper of the test tubes facing downward;
    a reading chamber associated with said at least one pipe, said reading chamber being at least partly transparent to radiations in a certain field of wavelengths, and having at least one substantially rectilinear segment of reduced size inside which the blood sample to be analyzed is introduced, and in that the reading chamber consists of a tube made of plastic material, or glass, defining a capillary channel coupled in fluidic continuity with said pipe,
    wherein said reading chamber is configured to allow to read the blood sample also in conditions of absence of gravity.

2. The apparatus as in claim 1, wherein said reading chamber and/or said capillary have a section of 0.8 µm2.

3. The apparatus as in claim 1, wherein said reading chamber is associated with thermostat means.

4. The apparatus as in claim 1, further comprising means to mix the sample before it is analyzed, of the tilting or rotary type.

5. The apparatus as in claim 1, wherein said detector device is configured to detect electromagnetic waves with a wavelength comprised between 700 nm and 1 mm.

6. The apparatus as in claim 1, wherein said pump is a peristaltic pump, configured to move the blood sample to the established reading point.

7. The apparatus as in claim 1, wherein said control and processing unit is configured to compare the values detected by said detector device with preset values, and to signal to the user the possible non-suitability of the blood sample.

8. An apparatus to determine erythrocyte sedimentation rate and other connected parameters, comprising:
    a sampling member to take the blood sample to be analyzed disposed in test tubes;
    a pipe inside which the blood sample is able to be introduced, transparent to electromagnetic radiations in a field comprised between 100 and 2000 nm;
    a circuit that connects said sampling member to said pipe and inside which the blood sample circulates;
    a pump associated with said circuit and cooperating with means to create an air bubble between two successive blood samples;
    a discharge pipe to discharge the blood sample after the analysis;
    a measuring instrument comprising a radiation emitter device associated with a mating detector device, together defining a measuring zone;
    a control and processing unit able to manage the functioning of said apparatus;
    an interface unit that connects said radiation emitter and mating detector devices to said control and processing unit, wherein said pump, with each measuring cycle, is configured to take a quantity of blood in a range from 30 microliters to 180 microliters, and wherein said measuring instrument is configured to perform the measurement on a quantity equal to about 1 final microliter of said initial sample quantity;

a motor to make the test tubes rotate or tilt before the sampling in order to perform programmed mixing cycles of the blood contained in the test tubes, wherein said sampling member is configured to take the blood sample from the test tubes both oriented with a stopper of the test tubes facing upward and also oriented with the stopper of the test tubes facing downward; and a second external sampling member provided with another circuit, independent from said first circuit, said second sampling member being able to take the blood sample from a test tube from the top downward.

9. A method to determine erythrocyte sedimentation rate and other connected parameters, performed by the emission, by emitter means, of radiations that pass through a sample being examined disposed in test tubes, and the detection, by detector means, of radiations after the passage through said sample, wherein the sample is introduced into a pipe which passes through a measuring zone thanks to the action of a pump, said detector means defining a reading and measuring point, which creates an air bubble in the pipe between two successive blood samples, to determine a zero detection point starting from the passage of said air bubble through a detection point, and to drive the pump in a controlled manner in order to obtain a detection by said emitter means and detector means on a final fraction of a known and preset quantity of the blood sample, wherein the method further comprises detecting the aggregation of red cells, and hence the measurement of the ESR, by using electromagnetic radiation at 1000 pulses per second, by means of said emitter means and said detector means.

10. The method as in claim 9, and providing that the reading and measuring point is located in a position such that, with respect to the measuring zone, a preset quantity of microliters of blood, downstream of said air bubble, passes and is made to flow through the measuring zone as an inert passage, without any measuring of said quantity, and the reading of the sample is started for a portion of 1 microliter in volume.

11. The method as in claim 9, said method is performed with a volume of whole blood taken from a test tube of the EDTA/citrate type and/or with a volume of native blood just taken from a patient.

12. The method as in claim 9, further comprising using three-level turbidity latexes to calibrate the accuracy of the measurement.

13. The method as in claim 9, including perforating a stopper of the test tube before the analysis, in order to air the sample.

14. The method as in claim 9, including detecting radiations by a plurality of detector devices during a single reading of the sample, so as to improve possible compensations.

15. The method as in any claim from 9, including detecting the aggregation of red cells, and hence the measurement of the ESR, by actuating variable mixes of the sample in relation to the quantity of blood contained in said test tubes.

16. The method as in claim 9, which, following mixing, overturning said test tube so as to dispose the part provided with the stopper facing downward.

17. The method as in claim 9, providing a statistical control of a population based on the values comprised in a database.

* * * * *

UNITED STATES PATENT AND TRADEMARK OFFICE
CERTIFICATE OF CORRECTION

PATENT NO. : 11,906,413 B2
APPLICATION NO. : 17/048605
DATED : February 20, 2024
INVENTOR(S) : Paolo Galiano Page 1 of 1

It is certified that error appears in the above-identified patent and that said Letters Patent is hereby corrected as shown below:

In the Claims

At Column 16, Line 25, "0.8 μm2." should be -- 0.8 μm$^2$. --.

At Column 18, Line 22, "The method as in any claim from 9," should be -- The method as in claim 9, --.

Signed and Sealed this
Eleventh Day of February, 2025

Coke Morgan Stewart
*Acting Director of the United States Patent and Trademark Office*